(12) United States Patent
Burroughs et al.

(10) Patent No.: US 7,305,572 B1
(45) Date of Patent: Dec. 4, 2007

(54) DISK DRIVE INPUT SEQUENCING FOR STAGGERED DRIVE SPIN-UP

(75) Inventors: John V. Burroughs, East Sandwich, MA (US); Stephen E. Strickland, Marlborough, MA (US); Timothy E. Dorr, Lancaster, MA (US)

(73) Assignee: EMC Corporation, Hopkinton, MA (US)

( * ) Notice: Subject to any disclaimer, the term of this patent is extended or adjusted under 35 U.S.C. 154(b) by 448 days.

(21) Appl. No.: 10/950,950

(22) Filed: Sep. 27, 2004

(51) Int. Cl.
*G06F 1/26* (2006.01)
(52) U.S. Cl. .............. 713/300; 713/310; 713/330; 360/272; 720/699; 369/47.5; 369/230
(58) Field of Classification Search ............... 713/300
See application file for complete search history.

(56) References Cited

U.S. PATENT DOCUMENTS

| | | | |
|---|---|---|---|
| 3,710,214 A * | 1/1973 | Anderson | 318/102 |
| 4,233,666 A * | 11/1980 | Walberg et al. | 365/226 |
| 5,560,022 A | 9/1996 | Dunstan et al. | 713/300 |
| 6,012,124 A * | 1/2000 | Kamo et al. | 711/114 |
| 6,233,693 B1 | 5/2001 | Berglund et al. | 713/340 |
| 6,668,305 B1 * | 12/2003 | Henriquez | 711/112 |
| 6,868,501 B2 * | 3/2005 | Saitou et al. | 713/330 |
| 6,915,363 B2 * | 7/2005 | Wood et al. | 710/74 |
| 6,966,006 B2 | 11/2005 | Pacheco et al. | 713/300 |
| 6,983,338 B2 * | 1/2006 | Hadba et al. | 710/74 |
| 7,028,491 B2 * | 4/2006 | Horton | 62/158 |
| 7,173,821 B2 * | 2/2007 | Coglitore | 361/695 |
| 2002/0026595 A1 * | 2/2002 | Saitou et al. | 713/300 |
| 2005/0108588 A1 * | 5/2005 | Yuan | 713/330 |
| 2005/0193159 A1 * | 9/2005 | Ng et al. | 710/302 |
| 2007/0030641 A1 * | 2/2007 | Hall et al. | 361/685 |

* cited by examiner

*Primary Examiner*—Nitin C. Patel
(74) *Attorney, Agent, or Firm*—BainwoodHuang

(57) ABSTRACT

Disk drive spin-up is staggered to reduce peak power requirements. Spin-up of the drives is controlled by selectively delaying voltage inputs to the disk drives. Alternately, spin-up of the drives is controlled by staggering the timing of communications to the disk drives.

17 Claims, 7 Drawing Sheets

DISK DRIVE INPUT SEQUENCING FOR STAGGERED DRIVE SPIN-UP

FIELD OF THE INVENTION

The present invention relates generally to disk drives and more particularly to controlling disk drive spin-ups in a multi-drive environment.

BACKGROUND OF THE INVENTION

As storage technologies advance, disk drives continue to become faster and cheaper. As costs come down, computing, storage, and networking systems incorporate greater numbers of disk drives to maximize storage space and performance. As the numbers of drives in a system increases, power budgets must be adjusted.

Current disk drives, such as hard disk drives and CD drives, rely on mechanically rotating disks for storage of information. During operation, the disks rotate at very high rates of speed. Upon power-up and initialization, 3-4 times more current can be required to accelerate the rotation of the disk—or "spin up" the disk. In systems containing many such disks, a large amount of power is required upon power-up and initialization to spin up the disks. However, this large amount of power is required only during the time that the disks are accelerating. Once brought up to speed, the disks require much less operational power.

In the past, power supply systems have been engineered to supply a large peak power to support disk spin-ups. This solution is uneconomical in terms of space, thermal margin, and cost, especially in lower cost systems including multiple disk drives.

Some new storage standards, such as the SATA II standard as described in the "Serial ATA II: Extensions to Serial ATA 1.0a" published by the Serial ATA Working Group, provide out of band (OOB) staggered drive spin-up support. New disk drive controllers and drives that conform to the standard cause disk drives to spin up at different times, thus reducing required peak power. This functionality, however, is provided only in the newest disk drives and chip sets.

It would be advantageous to be able to implement staggered drive spin-up in systems that utilize legacy disk drive controllers, in order to reduce peak power requirements and achieve the advantages of decreased space, improved thermal margin, and lower cost.

SUMMARY OF THE INVENTION

In accordance with the invention, disk drive spin-up is staggered to reduce peak power requirements. According to one aspect of the invention, a first input voltage is provided to a first set of one or more disk drives and a second set of one or more disk drives. A second input voltage that is different than the first input voltage is also provided to the first set of disk drives. The second input voltage is then provided to the second set a time interval after it is provided to the first set. The first and second sets of one or more disk drives spin up after the provision of the second input voltage. The spin-ups of the disk drives therefore occur at different times.

The first input voltage may be 12 Volts, while the second input voltage is 5 Volts. The 5V input controls the disk drive communications electronics; thus, delaying the provision of the second input voltage causes the disk drive to delay spinning up.

In accordance with another aspect of the invention, disk drive spin-up is controlled by staggering communications to the disk drives. A first device is coupled to a first disk drive via first disk communications lines. The first device allows communications to be transferred to the first disk drive when a first reset signal is released. A second device is coupled to a second disk drive via second disk communications lines. The second device allows communications to be transferred to the second disk drive when a second reset signal is released. A third device provides the first reset signal to the first device and the second reset signal to the second device so that the second reset signal is released a time interval after the first reset signal is released. The first and second disk drives spin up after communications are received. Since the communications are received at different times, the disk drives spin up at different times. This aspect of the invention is particularly useful in highly available storage systems including redundant controllers that communicate with the disk drives via reset capable multiplexers.

The various aspects of the invention are used to cause the multiple disk drives in a system to spin up at different times. This allows a reduction in system peak power requirements, saving space, thermal budget, and cost in storage systems.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
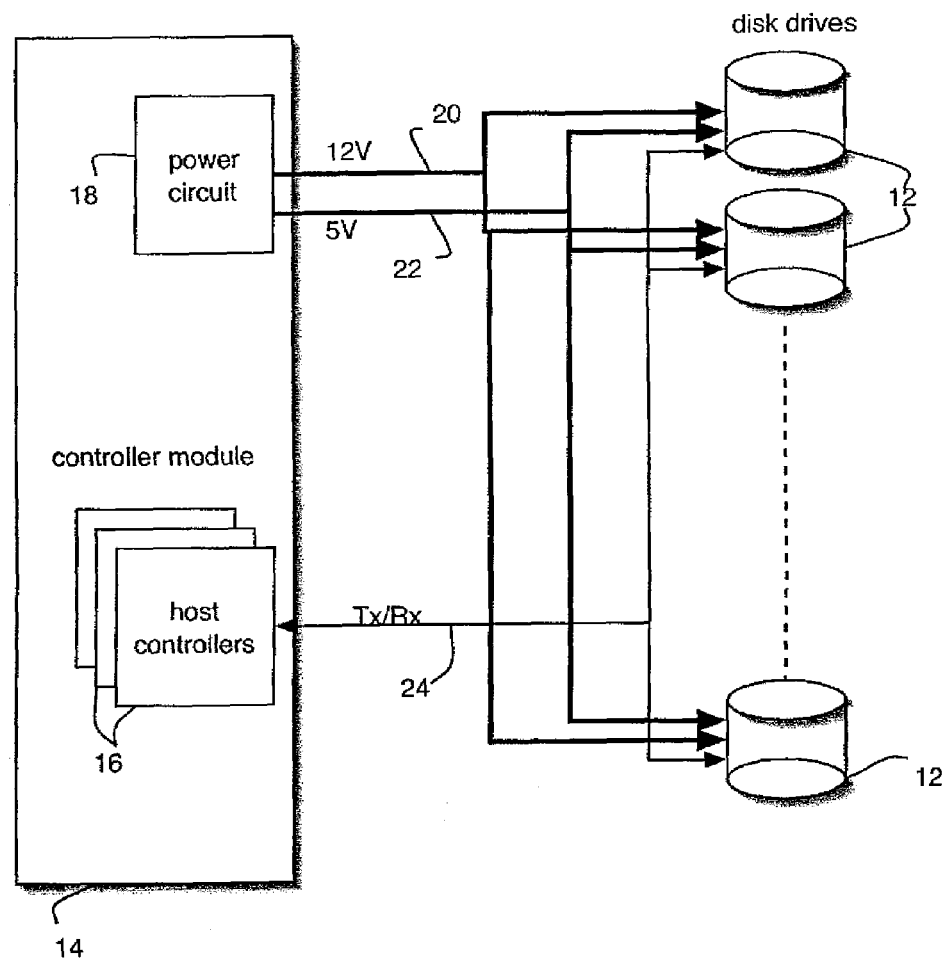
FIG. 1 is a schematic representation of a storage system in which the invention may be implemented.

Referring to FIG. 1, there is shown a storage system 10 that is one of many types of systems in which the principles of the invention may be employed. The storage system 10 includes multiple disk drives 12 coupled to a controller module 14. The controller module 14 includes one or more host controllers 16 and power circuit 18. The power circuit 18 provides two different voltages, for example 12 Volt (12V) power 20 and 5 Volt (5V) power 22, to the disk drives 12. The disk drives 12 use the different voltages for specific purposes. For example, the 12V power 20 may be used to power the mechanical parts of the rotation drives, while the 5V power 22 can be used to power on-board electronics. It is understood that other voltage values can be used without departing from the principles of the invention. For example, some drives may power their logic using 3.3V power.

The host controllers 16 and disk drives 12 communicate via communications signals 24, and in the case shown particularly via Transmit (Tx) and Receive (Rx) signals. The disk drives 12 may be for example SATA (Serial ATA) drives and the host controllers 16 may be SATA host controllers. Various types of host controllers are available to support differing numbers of drives. For example, in a system such as 10 that includes twelve disk drives 12, three host controllers might be provided to support four drives each. In a different embodiment, a host controller might support only one drive, and thus twelve host controllers 16 would be provided. The principles of the invention apply to all such embodiments.

In accordance with standard legacy SATA operation (see "Serial ATA: High Speed Serialized AT Attachment", published by the Serial ATA Working Group and incorporated herein by reference), upon power-up the host controller 16 sends communications to the drives 12 to which it is coupled via the signal lines 24. The communications may be for example in the form of a command sequence. When the drives 12 detect these commands, the drives spin up. It is known, however, that the control logic within each disk drive 12 that responds to communications on the signal lines 24 is powered via the 5V power 22 to the drive 12. Thus, if the 5V power 22 is not present, the drive 12 cannot respond to the commands from the host controller 16 and will not spin up. The invention exploits this functionality by delaying the provision of the 5V power 22 to the drives 12 in a selective manner in order to stagger drive spin-up.

Figure 2:
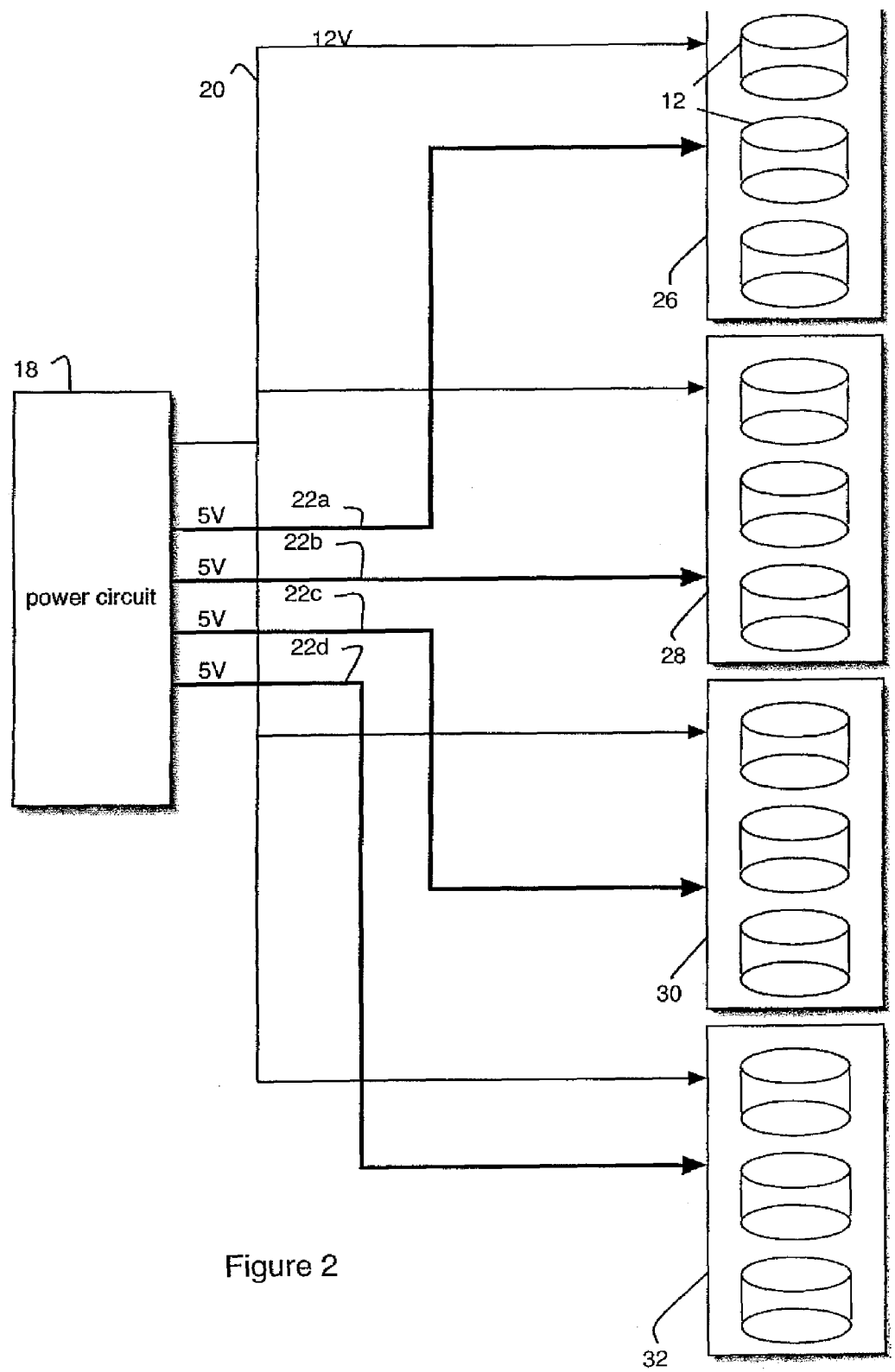
FIG. 2 is a schematic representation of power distribution in accordance with the invention.
Figure 3:
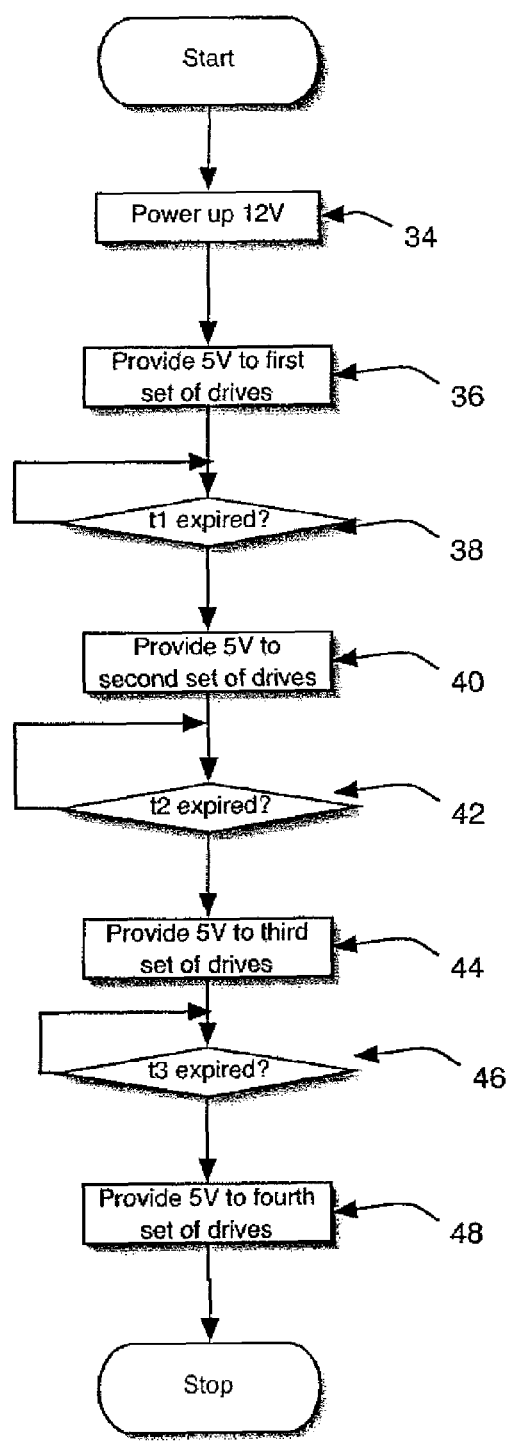
FIG. 3 is a flow diagram representing the timing of a voltage provided to the disk drives of FIGS. 1 and 2.

Referring to FIG. 2, there is shown one arrangement in accordance with the invention. The power circuit 18 provides four 5V power outputs 22a-d. The power outputs 22a are coupled to a first set 26 of three of the drives 12, the outputs 22b are coupled to a next set 28 of three drives 12, and outputs 22 c and d are coupled to third and fourth sets 30 and 32 of three drives 12 respectively. Referring also to FIG. 3, after the 12V power is provided to the drives 12 by the power circuit 18 (step 34), 5V power 22a is enabled to provide power to the first set 26 of three drives (step 36). There may or may not be a delay between the provisions of 12V power and 5V power 22a. Then, after a delay t1 (step 38), the 5V power 22b is enabled to provide power to the second set 28 of three drives (step 40). After a delay t2 (step 42), the 5V power 22c is enabled to provide power to the third set 30 of three drives (step 44). And after a delay t3 (step 46), the 5V power 22d is enabled to provide power to the fourth set 32 of three drives (step 48). The delays t1, t2, t3, and t4 may be the same or different amounts of time, and may be provided by separate timers or by a single timer with multiple outputs. However implemented, the time interval between the successive applications of 5V power to the drives 12 is at least sufficient to allow completion of a drive spin-up sequence.

Figure 4:
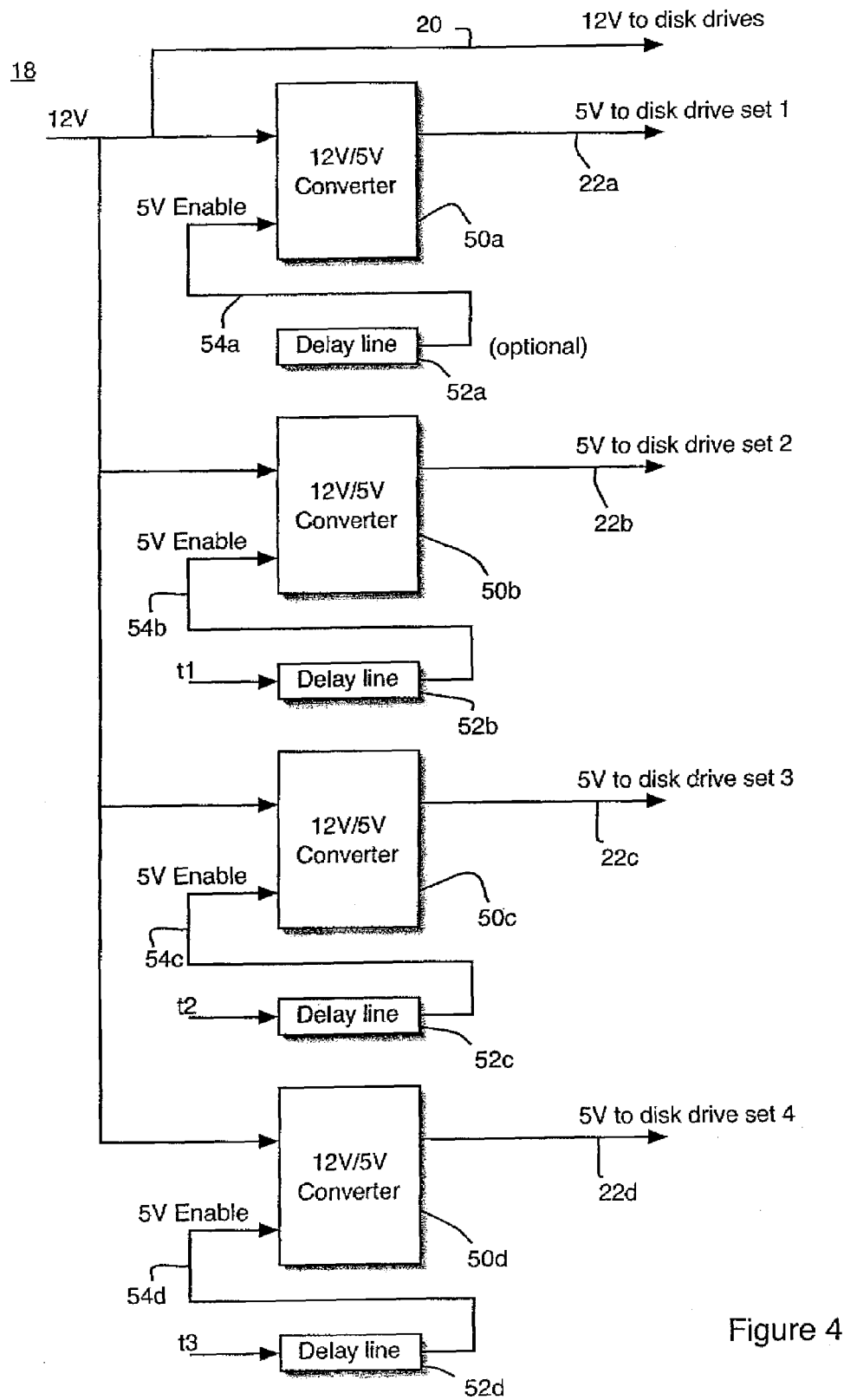
FIG. 4 is a schematic representation of an embodiment of the invention of FIGS. 2 and 3.

One implementation of the power sequencing of FIGS. 2 and 3 is shown in FIG. 4. The power circuit 18 includes four voltage converters 50a-50b, and four programmable delay components 52a-52b. The voltage converters can be for example Delta Electronics 12S2506A-1 converters. The delay components 52a-52b can be for example Maxim MAX6423XS22T components. Each voltage converter 50a-50d receives the 12V power 20 as input, and produces a corresponding 5V power 22a-22d as output. An enable signal 54a-54d on each voltage converter 50a-50d controllers the 5V output on each voltage converter 50a-50d. The 5V powers 22a-22d are not provided unless the proper signal is received on the corresponding enable signal 54a-54d. Each programmable delay component 52a-52d drives the corresponding enable signal 54a-54d to the voltage converters 50a-50d. Each programmable delay component 52a-52d is programmed to hold off the provision of its corresponding enable signal 54a-54d in proportion to one of the delay times t1-t4. Thus, the provision of 5V power 22a-22d provided to the corresponding sets of drives 26, 28, 30, and 32 is staggered in time. Each set of drives 26, 28, 30, and 32 therefore spins up at different times, reducing the peak system power required.

Though FIG. 4 sets out one specific implementation, it is understood that many other means could be provided for staggering the provision of 5V power to the drives 12. For example, 12V and 5V power could be provided on separate rails rather than via a voltage converter. Any sort of controller that can be programmed for delay could be coupled to enable separate 5V inputs to sets of drives. Such a controller could be programmed in hardware via the configuration of inputs to provide the appropriate delays, or could be programmed via software to provide the delays. The invention is thus not limited to any particular means of delaying 5V power to the drives. Furthermore, though particular numbers of drives are described as powered up in sets, the invention is not limited to any particular numbers of drives, delayed power inputs, or controllers. These numbers can be chosen flexibly in accordance with the particulars of a given design environment.

Figure 5:
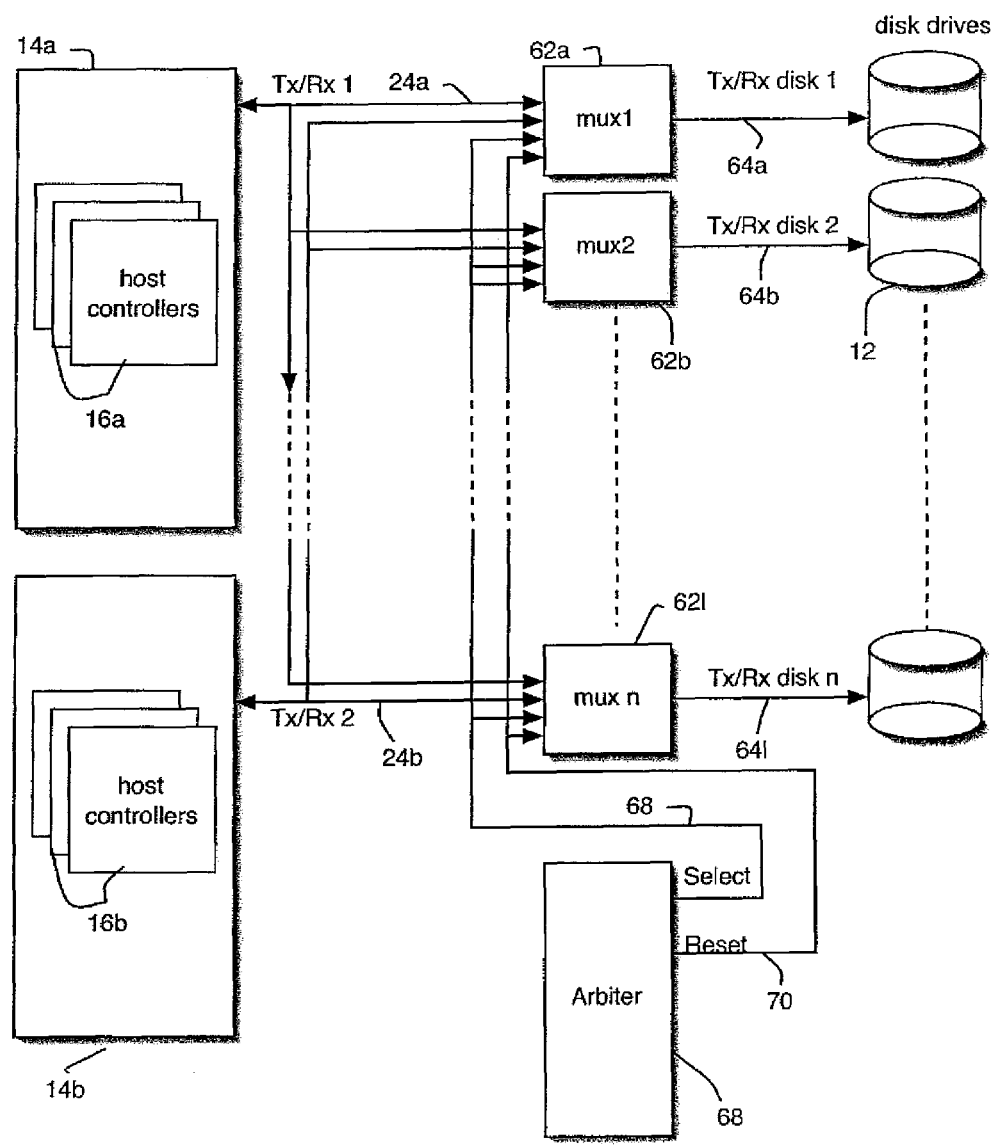
FIG. 5 is a schematic representation of a highly available storage system.

In FIG. 5 there is shown another type of storage system in which the principles of the invention are advantageously employed. This storage system 60 is referred to as a highly available system. Many redundancies are employed in a highly available system in order to avoid downtime to due to component and system failures. In this storage system, two controller modules 41a-14b are provided. Each controller module 14a-14b is coupled to the twelve disk drives 12 in a redundant manner. There are twelve multiplexers 62a-62l coupled between the controller modules 14a-14b and each disk drive 12. Each multiplexer 62a-62l selectively supplies communications Tx and Rx signals 24a-24b from the controller modules 14a-14b to drive the disk communications Tx and Rx lines 64a-64l to the disk drives 12. In this manner, either one or the other of the controller modules 14a-14b can access any disk drive 12 at any one time. An arbiter 66 is coupled to the multiplexers 62a-62l to control the access of the controller modules 14a-14b to the disk drives 12. The arbiter 66 drives a select line 68 to cause a multiplexer 62 to pass communications from either controller module 14a or 14b to the disk communications lines 64, or the arbiter 66 can drive a reset line 70 that causes the multiplexer 62 to pass no signals.

As previously described, the host controller(s) 16 on each controller module 14a-14b will immediately attempt to send the standard SATA spin-up control sequence to the drives 12 upon power-up. Once the drives receive this sequence, they spin up. But, the drive will not spin up until the sequence is received. In accordance with the principles of the invention, the provision of the SATA control sequence to the drives is selectively delayed in order to stagger disk drive spin-ups.

Figure 6:
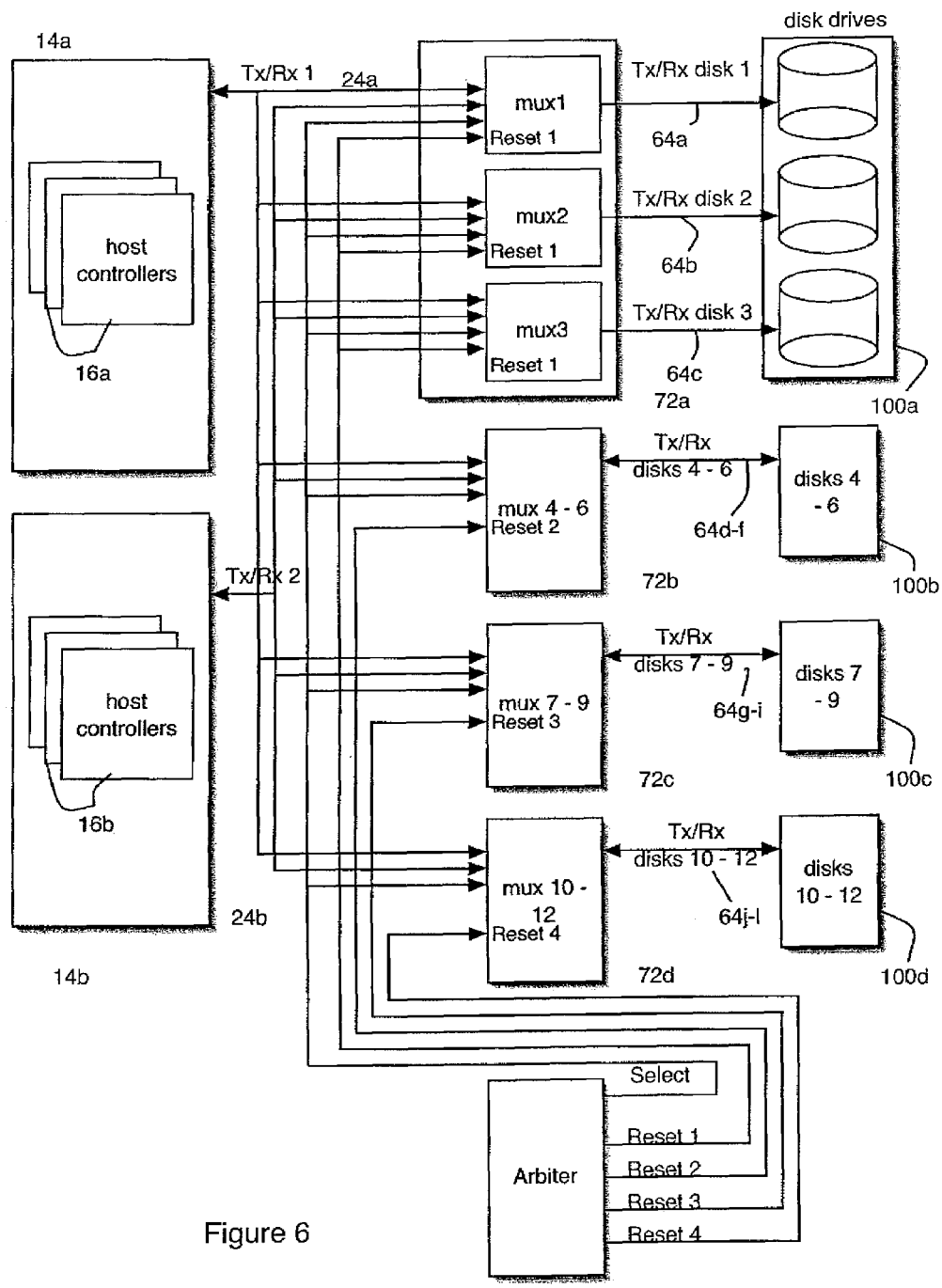
FIG. 6 is a schematic representation of the invention wherein staggered Reset signals are provided to devices that control disk communication.

In FIG. 6 there is shown an implementation of the invention for the system of FIG. 5. The arbiter 66 produces four reset signals Reset 70a-70d. Reset signals 70a are coupled to a first set of three multiplexers 72a. Reset signals 70b are coupled to a second set of three multiplexers 72b. Likewise, Reset signals 70c and 70d are coupled to third and fourth sets 72c and 72d of multiplexers respectively. The first set of multiplexers 72a provides communication over communications lines 64a-64c to the three disk drives of a first set 100a of disk drives 12. The second set of multiplexers 72b provides communication over communications lines 64d-64f to the three disk drives of a second set 100b of disk drives 12. The third set of multiplexers 72c provides communication over communications lines 64g-64l to the three disk drives of a third set 100c of disk drives 12. The fourth set of multiplexers 72d provides communication over communications lines 64j-64l to the three disk drives of a fourth set 100d of disk drives 12.

Figure 7:
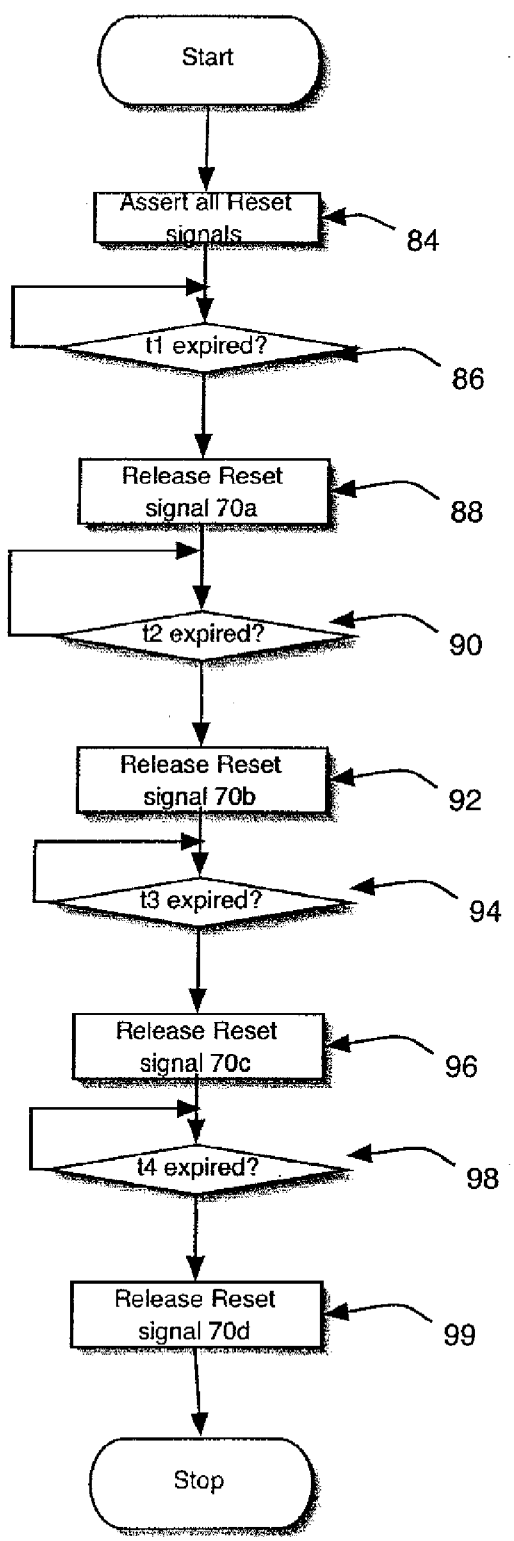
FIG. 7 is a flow diagram representing the timing of the Reset signals of FIG. 6.

Upon power-up, the arbiter 66 asserts all four Reset signals 70a-70d. At this time, none of the multiplexers 72a-72d passes signals to the disk drive communication lines 64a-1. Then, the Reset signals 70a-70d are selectively released in a staggered manner in time. Referring to FIG. 7, upon power-up all Reset signals 70a-70d are asserted, thus disabling communications between the controller modules 14a and 14b to the disk drives 12 (step 84). Then, after a delay t1 (step 86), the Reset signal 70a is released (step 88), thus passing sequence commands from a host controller 16 on one of the modules 14a-14b to the first set 100a of disk drives via the multiplexers 72a. After a delay t2 (step 90), the Reset signal 70b is released (step 92), thus passing sequence commands from one of the controller modules 14a-14b to the second set 100b of disk drives via the multiplexers 72b. After a delay t3 (step 94), the Reset signal 70c is released (step 96), passing sequence commands from one of the controller modules 14a-14b to the third set 100c of disk drives. And, after a delay t4 (step 98), the Reset signal 70d is released to provide sequence commands from a controller module 14a-14b to the fourth set 100d of three drives. The delays t1, t2, t3, and t4 may be the same or different amounts of time, but each is at least sufficient to allow completion of a drive spin-up sequence.

In the implementation shown in FIG. 6, the multiplexers may be custom designed, or may be available components such as Broadcom BCM5771A2KFB multiplexers. The arbiter can be custom designed and implemented in either an ASIC or a programmable logic device. The arbiter is shown as a single device, but can be implemented as a series of separate arbiters that control multiplexers or groups of multiplexers without departing from the principles of the invention. The design shown here utilizes four differently timed Reset signals to control groups of three disk drives; however, the numbers and arrangements of the example signals and components are not limited and are flexible in accordance with design requirements.

Furthermore, though this implementation describes a highly available storage system including two controller modules, the invention is equally applicable to systems without redundant controllers, such as the one shown in FIG. 1. In such a case, the multiplexer can be replaced with a simpler component that passes communications in response to the release of a signal such as a reset signal.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the invention. Further, although aspects of the present invention have been described herein in the context of a particular implementation in a particular environment for a particular purpose, those of ordinary skill in the art will recognize that its usefulness is not limited thereto and that the present invention can be beneficially implemented in any number of environments for any number of purposes.

We claim:

1. A method of controlling disk drive spin-up comprising the steps of:

providing a first input voltage to a first set of one or more disk drives and a second set of one or more disk drives;
providing a second input voltage that is different than the first input voltage level to the first set;
providing the second input voltage to the second set a time interval after it is provided to the first set;
wherein the first and second sets of one or more disk drives spin up after the provision of the second input voltage.

2. The method of claim 1 wherein the first input voltage is 12 volts and wherein the second input voltage is 5 volts.

3. The method of claim 2 wherein the first and second sets of disk drives comprise Serial Advanced Technology Attachment (SATA) disk drives.

4. The method of claim 1 wherein the first set of one or more disk drives includes multiple first disk drives having respective spindle motors;
wherein providing the second input voltage to the first set includes concurrently supplying the second input voltage to the multiple first disk drives having respective spindle motors;
wherein the second set of one or more disk drives includes multiple second disk drives having respective spindle motors; and
wherein providing the second input voltage to the second set a time interval after it is provided to the first set includes concurrently supplying the second input voltage to the multiple second disk drives having respective spindle motors.

5. The method of claim 4 wherein a common power circuit, which is external to the multiple first disk drives and the multiple second disk drives, is arranged to provide (i) the first input voltage on a first rail which is external to the multiple first disk drives and the multiple second disk drives and the second input voltage and (ii) the second input voltage on a second rail which is external to the multiple first disk drives and the multiple second disk drives.

6. The method of claim 4 wherein each of the multiple first disk drives and the multiple second disk drives is a storage device having (i) parts arranged to provide mechanical rotation and (ii) on-board electronics responsive to host controller communications; and
wherein providing the first input voltage includes outputting, to each of the multiple first disk drives and the multiple second disk drives, the first input voltage for use by the parts arranged to provide mechanical rotation of each of the multiple first disk drives and the multiple second disk drives;
wherein concurrently supplying the second input voltage to the multiple first disk drives includes outputting, to each of the multiple first disk drives, the second input voltage for use by the on-board electronics responsive to host controller communications of each of the multiple first disk drives; and
wherein concurrently supplying the second input voltage to the multiple second disk drives includes outputting, to each of the multiple second disk drives, the second input voltage for use by the on-board electronics responsive to host controller communications of each of the multiple second disk drives.

7. The method of claim 4 wherein concurrently supplying the second input voltage to the multiple first disk drives having respective spindle motors includes outputting the second input voltage from a first converter in response to a first enable signal received from a first delay line; and
wherein concurrently supplying the second input voltage to the multiple second disk drives having respective spindle motors includes outputting the second input voltage from a second converter in response to a second enable signal received from a second delay line, the first and second delay lines being arranged to delay a common enable signal by respective first and second time delays which are different from each other.

8. Apparatus comprising:
a power circuit for providing first and second input voltages to each of a first set of one or more disk drives and second set of one or more disk drives, wherein the first and second input voltages are different;
the power circuit operable to provide the second input voltage to the second set a time interval after the second input voltage is provided to the first set;
wherein the second input voltage is provided to cause the first and second sets of disk drives to spin up.

9. The apparatus of claim 8 wherein the power circuit comprises:
a voltage converter for converting the first input voltage to the second input voltage;
a delay component for providing the time interval.

10. The apparatus of claim 8 wherein the first set of one or more disk drives includes multiple first disk drives having respective spindle motors; and
wherein the second set of one or more disk drives includes multiple second disk drives having respective spindle motors.

11. The apparatus of claim 10 wherein a common power circuit, which is external to the multiple first disk drives and the multiple second disk drives, is arranged to provide (i) the first input voltage on a first rail which is external to the multiple first disk drives and the multiple second disk drives and the second input voltage and (ii) the second input voltage on a second rail which is external to the multiple first disk drives and the multiple second disk drives.

12. The apparatus of claim 10 wherein each of the multiple first disk drives and the multiple second disk drives is a storage device having (i) parts arranged to provide mechanical rotation, the parts being arranged to receive the first input voltage, and (ii) on-board electronics responsive to host controller communications, the on-board electronics being arranged to receive the second input voltage.

13. The apparatus of claim 10 wherein the power circuit includes:
a first converter and a first delay line coupled to the first converter, the first converter being arranged to output the second input voltage in response to a first enable signal received from a first delay line; and
a second converter and a second delay line coupled to the second converter, the second converter being arranged to output the second input voltage in response to a second enable signal received from a second delay line, the first and second delay lines being arranged to delay a common enable signal by respective first and second time delays which are different from each other.

14. A storage system, comprising:
multiple disk drives, each of the multiple disk drives including rotation circuitry arranged to operate in response to a first power supply signal, and data storage control logic arranged to operate in response to a second power supply signal;
a control assembly having a power circuit and a host controller, the power circuit being arranged to output the first and second power supply signals, the host controller being arranged to direct operation of each disk drive via communications with the data storage control logic of that disk drive; and
a set of power rails interconnected between the control assembly and the multiple disk drives, the set of power rails being arranged to convey the first and second power supply signals outputted from the power circuit of the control assembly to the multiple disk drives;
the power circuit of the control assembly being arranged to concurrently provide the first power supply signal to the rotation circuitry of each of the multiple disk drives;
the power circuit of the control assembly being arranged to provide the second power supply signal to the data storage control logic of a first set of disk drives at a first time, the first set of disk drives including at least two disk drives;
the power circuit of the control assembly being arranged to provide the second power supply signal to the data storage control logic of a second set of disk drives at a second time substantially after the first time, the second set of disk drives including at least two disk drives.

15. A data storage system as in claim 14 wherein the power circuit of the control assembly is further arranged to provide power to the host controller of the control assembly.

16. A data storage system as in claim 15 wherein the set of power rails includes:
a first power rail interconnected between the power circuit of the control assembly and the first set of disk drives;
a second power rail interconnected between the power circuit of the control assembly and the second set of disk drives, the first and second power rails being electrically isolated from each other.

17. A data storage system as in claim 16 wherein the power circuit includes:
a first delay line arranged to provide a first enable signal at the first time;
a first converter arranged to provide the second power signal onto the first power rail in response to the first enable signal from the first delay line;
a second delay line arranged to provide a second enable signal at the second time;
a second converter arranged to provide the second power signal onto the second power rail in response to the second enable signal from the second delay line.

* * * * *